United States Patent
Hupert

[15] 3,663,004
[45] May 16, 1972

[54] CLAMPING DEVICE

[72] Inventor: Adam Hupert, 50 Harbor Road, Port Tobacco, Md. 20667

[22] Filed: Oct. 15, 1970

[21] Appl. No.: 80,958

[52] U.S. Cl. ............................269/157, 24/263 B, 145/1 B, 269/196, 269/229, 269/321 S
[51] Int. Cl. .......................................B25b 5/02, B25b 5/08
[58] Field of Search .....................24/263 B, 263 LL; 81/128; 145/1 B; 269/147, 148, 157, 162, 163, 196, 229, 230, 236, 321 F

[56] References Cited

UNITED STATES PATENTS

| 805,949 | 11/1905 | Facette | 24/263 B |
| 2,236,439 | 3/1941 | McKenna | 269/229 |
| 3,189,341 | 6/1965 | Maurus | 269/236 X |

Primary Examiner—Theron E. Condon
Assistant Examiner—Neil Abrams
Attorney—Lane, Aitken, Dunner & Ziems

[57] ABSTRACT

A clamping device wherein an actuating lever is pivotally mounted to a first clamping plate and extends to a second clamping plate disposed parallel to the first plate. The lever engages the second plate in a manner to force the plates together into a clamping position upon movement of the lever.

10 Claims, 5 Drawing Figures

INVENTOR
ADAM HUPERT

BY Lane, Aitken, Dunner & Ziems
ATTORNEYS

INVENTOR
ADAM HUPERT

BY Lane, Aitken, Dunner & Ziems
ATTORNEYS 3,663,004

CLAMPING DEVICE

BACKGROUND OF THE INVENTION

This invention relates to a clamping device, and more particularly to a device for clamping two workpieces together in conjunction with the assembly of the workpieces.

In the construction art there is frequently a need for fastening a series of vertical studs between two horizontally-extending toe plates. In the construction of walls, for example, the wall frames are formed by a series of studs which must be equally spaced between the plates in order to accomodate a plurality of sheets of gypsum board, panel members, or the like. Since the latter sheets are of a uniform width, the assembly of the studs to the plates must be exact.

The normal procedure for fastening a vertical stud between two plates is by simply holding the stud in position and "toe-nailing" it to the plate using angularly disposed nails. However, the driving of a nail into the stud often causes slight movement of the stud in the direction of the blow, therefore causing misalignment.

Although several devices have been proposed for clamping the stud relative to the plate for the purposes of nailing, they are often difficult to operate and therefore take a prohibitive amount of time.

SUMMARY OF THE INVENTION

It is therefore an object of the present invention to provide a clamping device for rigidly supporting a stud in place with respect to a plate which is easily and quickly operated, and which enables an operator to fasten the stud to the plate with a great deal of precision.

Toward the fulfillment of this object, the device of the present invention comprises a first clamping member, a second clamping member, an operating lever pivotally mounted to said first clamping member and extending to said second clamping member, and cooperating means on said second clamping member and said lever for forcing said clamping members together upon movement of said lever.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope.

DESCRIPTION OF THE PREFERRED EMBODIMENTS

Figure 1:
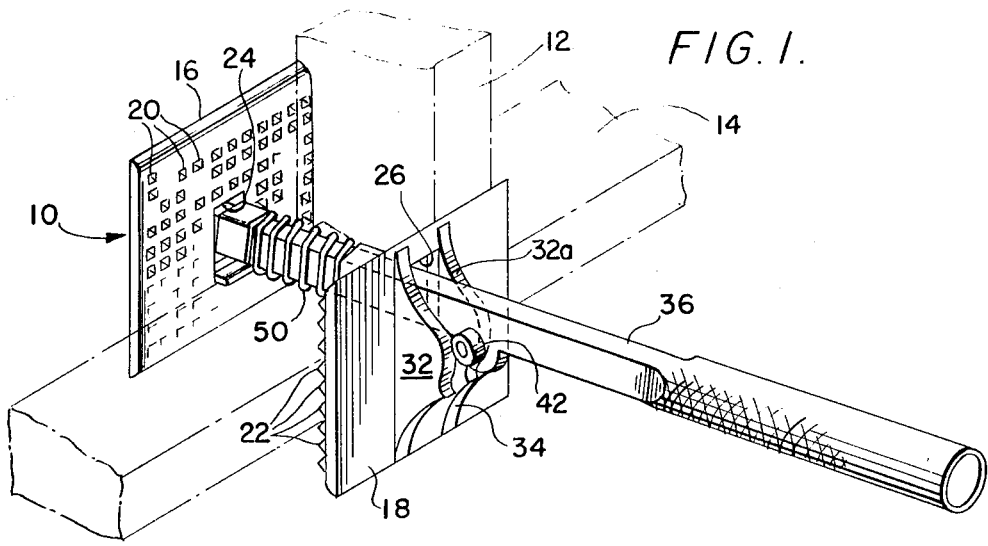
FIG. 1 is a perspective view of the device of the present invention shown clamping a stud member to a plate member.

Referring specifically to the drawings, the reference numeral 10 refers in general to the clamping device of the present invention, which is shown in position for clamping a vertically extending stud member 12 to a horizontally disposed plate member 14 for the purposes of nailing the stud member to the plate member.

The clamping device comprises a pair of spaced parallel plates 16 and 18, the inner faces of which are provided with a plurality of projections 20 and 22, respectively. These projections may be formed by machining the plate members or by casting same, in a conventional manner.

A pair of slots 24 and 26 are provided through the plates 16 and 18, respectively, with the slot 26 having a longer length than the slot 24 for reasons that will be apparent from the following.

Figure 2:
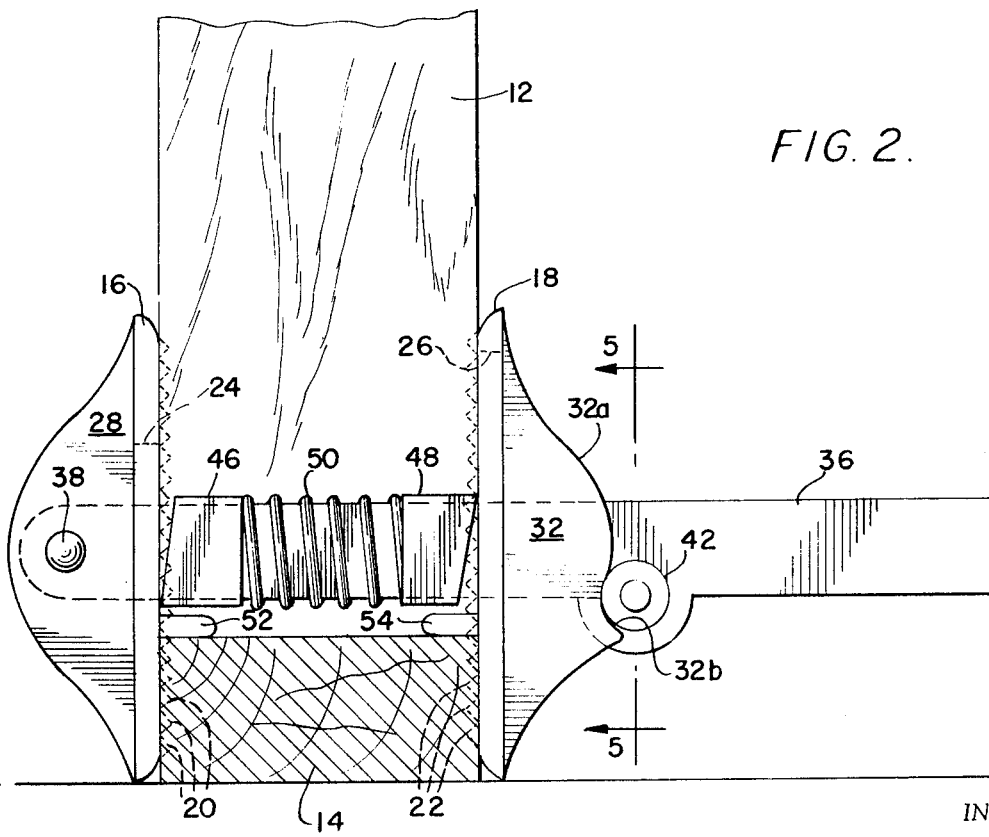
FIG. 2 is an enlarged side elevational view of the arrangement of FIG. 1, with the plate member being shown in cross-section.
Figure 3:
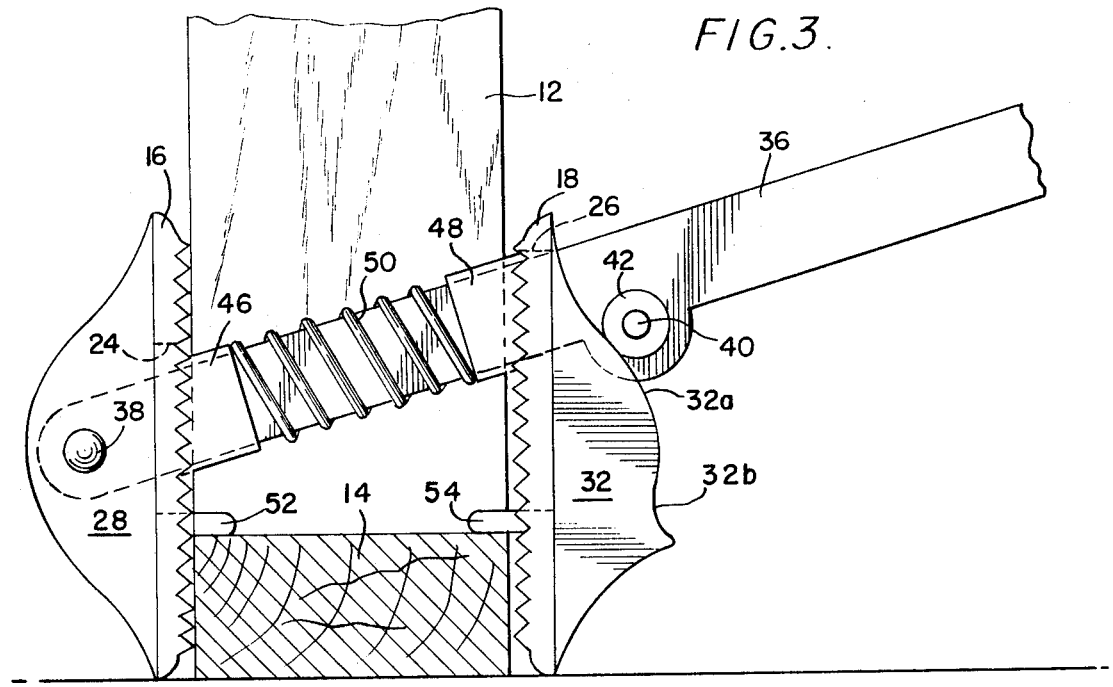
FIG. 3 is a view similar to FIG. 2, showing the clamping device positioned relative to the stud and plate member but in a relaxed, or nonclamping, position.
Figure 4:
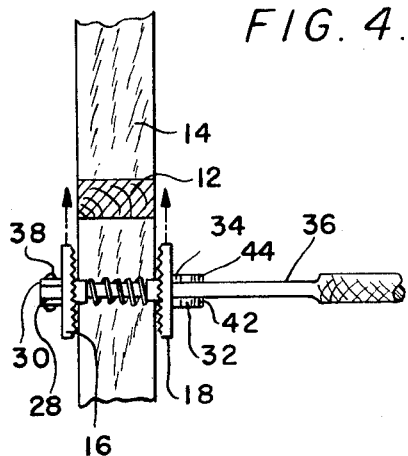
FIG. 4 is a reduced top plan view showing the device of the present invention immediately before being positioned relative to the stud and plate member.

As better seen in FIGS. 2–4, the plate 16 has a pair of ribs 28 and 30 extending from the outer face thereof, each having an aperture formed therein. In a similar manner, a pair of ribs 32 and 34 extend from the outer face of the plate 18, the outer surface of each rib forming a cam for purposes that will be described in detailed later.

One end of an operating lever 36 is pivotally mounted to a pin 38 extending through the apertures in the ribs 28 and 30 of the plate 16. The lever 36 also extends through the slots 24 and 26 of the plates 16 and 18, respectively, and projects outwardly from the slot 26. A pin 40 extends through the lever and receives a pair of rollers 42 and 44 spaced apart a distance corresponding to the distance between the ribs 32 and 34 of the plate 18.

Figure 5:
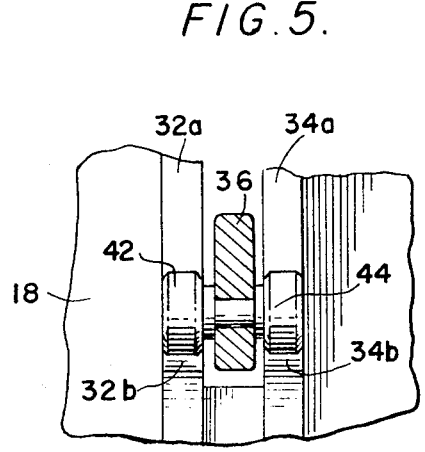
FIG. 5 is a cross-sectional view taken along the line 5—5 of FIG. 2.

A portion of each of the ribs 32 and 34 gradually increases in width from its upper portion to its lower portion as viewed in FIGS. 2 and 3, to form a cam surface shown by the reference numeral 32a. A recessed portion 32b is also formed immediately below the portion 32a. As shown in FIG. 5, the rib 34 has two portions 34a and 34b which are identical in shape to the rib portions 32a and 32b, respectively.

A pair of sleeves 46 and 48 extend over the lever 36 and are of a width slightly greater than that of the slots 24 and 26, respectively. A compression spring 50 extends over the lever 36 in engagement with each of the sleeves 46 and 48 to urge same outwardly against the inner faces of the plates 16 and 18, respectively. The engaging surfaces of the sleeves 46 and 48 extend at an angle with respect to their respective plates in the horizontal position of the lever 36 as shown in FIG. 2.

A pair of lugs 52 and 54 project from the plates 16 and 18, respectively, in order to locate the latter relative to the plate member 14.

In operation, the clamping device 10 is brought in proximity to the stud member 12 and plate member 14 as shown in FIG. 4, and moved towards the stud member in the direction shown by the arrows, with the lugs 52 and 54 riding on the plate member to locate the clamping device in a vertical direction. This movement continues until the vertical stud member extends completely between the plates 16 and 18. The lever 36 is then pushed downwardly, causing the rollers 42 and 44 to ride along the cam surfaces 32a and 34a, respectively, and force the plate members 16 and 18 towards each other until the rollers 42 and 44 extend within the recessed rib portions 32b and 34b, as shown in FIG. 2. In this position the stud member 12 is clamped to the plate member 14 with the projections 20 and 22 embedded therein to reinforce the clamping action.

As a result of the above, the stud member 12 can be fastened to the plate member 14 in a conventional manner, such as by driving nails into the side of the stud member opposite from the lever 36. After the nailing is completed, the lever 36 is pushed upwardly to the position shown in FIG. 3, causing a release of the clamping force and permitting removal of the device.

The action of the compression spring 50 acting outwardly upon the plate members 46 and 48 accomplishes two purposes. First of all, it aids in freeing the projections 20 and 22 from the studs 12 and 14 during removal of the device, and in addition, it maintains the plate members 16 and 18 in a parallel spaced relation through the complete operation of the device, despite movement of the lever 36 to the position shown in FIG. 3. The latter is aided by the fact that the engaging surfaces of the sleeves 46 and 48 extend parallel to the upper portions of the inner faces of the plate members 16 and 18 in the latter position of the lever 36.

According to a main feature of the clamping device of the present invention, the device can be operated by one hand due to its simplicity, which greatly facilitates the assembling operation.

Also, the device may be utilized in a corner, and can be utilized to clamp a stud member to an upper plate member in the vicinity of a ceiling, in a similar manner. In addition, it is apparent that the device can be used in any other related clamping situations.

Of course, variations of the specific construction and arrangement of the clamping device disclosed above can be made by those skilled in the art without departing from the invention as defined in the appended claims.

I claim:

1. A clamping device comprising a first clamping member, a second clamping member, an operating lever pivotally mounted to said first clamping member and extending to said second clamping member, and cooperating means on said lever and said second clamping member for forcing said clamping members together upon movement of said lever about its pivotal connection to said first clamping member.

2. The device of claim 1 wherein said cooperating means comprises at least one cam surface formed on said second clamping member.

3. The device of claim 2 wherein said cooperating means further comprises at least one roller carried by said lever for engaging said cam surface.

4. The device of claim 3 wherein said lever extends through a slot formed in said second clamping member and terminates at a handle portion spaced from said cam surface.

5. The device of claim 1 further comprising a lug projecting from at least one of said clamping members for locating said device relative to a workpiece.

6. The device of claim 1 further comprising means for maintaining said clamping members in a spaced parallel position prior to the forcing of said clamping members together.

7. The device of claim 6 wherein said means for maintaining said clamping members in a spaced parallel position comprises at least one sleeve extending over said lever and between said clamping members, and a spring engaging said sleeve and urging same into engagement with said second clamping member.

8. The device of claim 6 wherein said means for maintaining said clamping members in a spaced parallel position is also adapted to urge said clamping members apart upon release of said force.

9. The device of claim 1 further comprising means for urging said clamping members apart upon release of said force.

10. The device of claim 1 wherein said clamping members comprise a pair of spaced plates having workpiece engaging projections formed on the facing surfaces thereof.

* * * * *